United States Patent
Lee et al.

(10) Patent No.: US 11,178,687 B2
(45) Date of Patent: *Nov. 16, 2021

(54) METHOD AND USER EQUIPMENT FOR RECEIVING DOWNLINK SIGNALS

(71) Applicant: LG Electronics Inc., Seoul (KR)

(72) Inventors: Jeonggu Lee, Seoul (KR); Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,641

(22) Filed: Oct. 1, 2019

(65) Prior Publication Data

US 2020/0137786 A1 Apr. 30, 2020

Related U.S. Application Data

(63) Continuation of application No. 16/314,271, filed as application No. PCT/KR2018/002928 on Mar. 13, 2018, now Pat. No. 10,542,559.

(Continued)

(51) Int. Cl.
*H04W 72/12* (2009.01)
*H04L 1/18* (2006.01)
(Continued)

(52) U.S. Cl.
CPC ....... *H04W 72/1289* (2013.01); *H04L 1/1816* (2013.01); *H04L 1/1822* (2013.01);
(Continued)

(58) Field of Classification Search
CPC . H04W 72/1289; H04W 76/28; H04W 72/14; H04W 72/1294; H04L 1/1822;
(Continued)

(56) References Cited

U.S. PATENT DOCUMENTS 10,278,207 B2   4/2019 Lee
10,602,394 B2 * 3/2020 Tseng ............... H04W 28/0278
(Continued)

FOREIGN PATENT DOCUMENTS

CN   101483885   7/2009
CN   102625432   8/2012
(Continued)

OTHER PUBLICATIONS

Ericsson, "Lightweight CSI feedback", 3GPP TSG-RAN WG1 #87ah-NR, R1-1700757, Spokane, WA, USA, Jan. 16-20, 2017, pp. 1-2.
(Continued)

*Primary Examiner* — Jay P Patel
(74) *Attorney, Agent, or Firm* — Fish & Richardson P.C.

(57) ABSTRACT

A user equipment (UE) starts a downlink (DL) discontinuous reception (DRX) retransmission timer for a DL hybrid automatic repeat and request (HARQ) process of the UE. The UE monitors a physical downlink control channel (PDCCH) while the DL DRX retransmission timer for the DL HARQ process is running. The UE stops the DL DRX retransmission timer for the DL HARQ process when the UE receives a PDCCH indicating a uplink (UL) transmission.

14 Claims, 10 Drawing Sheets

Related U.S. Application Data

(60) Provisional application No. 62/475,805, filed on Mar. 23, 2017.

(51) Int. Cl.
| | | |
|---|---|---|
| *H04W 76/28* | (2018.01) | |
| *H04L 5/16* | (2006.01) | |
| *H04W 72/14* | (2009.01) | |

(52) U.S. Cl.
CPC ............. *H04L 1/1851* (2013.01); *H04L 5/16* (2013.01); *H04W 72/14* (2013.01); *H04W 76/28* (2018.02)

(58) Field of Classification Search
CPC ....... H04L 1/1816; H04L 5/16; H04L 1/1851; H04L 1/1864; H04L 1/1812; H04L 1/1848

See application file for complete search history.

(56) References Cited

U.S. PATENT DOCUMENTS

| | | | |
|---|---|---|---|
| 10,763,947 B2* | 9/2020 | Kim ...................... | H04W 72/04 |
| 2009/0232054 A1 | 9/2009 | Wang | |
| 2009/0232118 A1 | 9/2009 | Wang | |
| 2010/0037114 A1 | 2/2010 | Huang et al. | |
| 2011/0294491 A1 | 12/2011 | Fong | |
| 2012/0176950 A1 | 7/2012 | Zhang | |
| 2013/0308507 A1* | 11/2013 | Wanstedt .......... | H04W 52/0216 370/311 |
| 2014/0198701 A1 | 7/2014 | Ostergaard | |
| 2015/0098414 A1* | 4/2015 | Kuo ...................... | H04W 72/04 370/329 |
| 2015/0319744 A1* | 11/2015 | Jung ................. | H04W 72/0406 370/328 |
| 2016/0044641 A1 | 2/2016 | Bai et al. | |
| 2017/0134124 A1* | 5/2017 | Lee .......................... | H04L 1/08 |
| 2017/0202054 A1 | 7/2017 | Rathonyi | |
| 2017/0339682 A1* | 11/2017 | Lee ...................... | H04L 1/1812 |
| 2018/0110085 A1 | 4/2018 | Tseng | |
| 2018/0167883 A1 | 6/2018 | Guo | |
| 2018/0302820 A1 | 10/2018 | Heo | |
| 2019/0053322 A1 | 2/2019 | Wu | |
| 2019/0082492 A1 | 3/2019 | You | |
| 2020/0396790 A1* | 12/2020 | Rathonyi .............. | H04L 1/1812 |

FOREIGN PATENT DOCUMENTS

| | | | |
|---|---|---|---|
| CN | 101635615 | 12/2015 | |
| CN | 105122858 | 12/2015 | |
| CN | 106535336 | 3/2017 | |
| EP | 2782409 A1 * | 9/2014 | .......... H04W 72/042 |
| EP | 3148270 A1 * | 3/2017 | .......... H04W 72/005 |
| JP | 2018101823 A * | 6/2018 | ........ H04W 72/0446 |
| KR | 100988876 | 10/2010 | |
| KR | 101053842 | 8/2011 | |
| KR | 101404996 | 6/2014 | |
| KR | 20140071637 A * | 6/2014 | |
| KR | 101570902 | 11/2015 | |
| RU | 2604830 | 12/2016 | |
| WO | WO2010147956 | 12/2010 | |
| WO | WO2016160290 | 10/2016 | |
| WO | WO2016175007 | 11/2016 | |
| WO | WO2017122135 | 7/2017 | |

OTHER PUBLICATIONS

Ericsson, "On the impact of supporting 2 HARQ processes on connected mode DRX in NB-IoT", 3GPP TSG-RAN WG2 #96, R2-167628, Reno, Nevada, USA. Nov. 14-18, 2016, pp. 1-5.

Huawei et al, "Support 2 HARQ Processes in NB-IoT", 3GPP TSG, RAN WG2 Meeting #95bis, R2-166327, Kaohsiung. Oct. 10-14, 2016, pp. 1-4.

LG Electronics Inc. et al. Reconsideration on drx-lnactivitvTimer for NB-loT, 3GPP TSG-RAN WG2 Meeting #94, R2-164202. Narijing, China. May 23-27, 2016, pp. 1-6.

Russian Office Action in Russian Application No. 2019122157, dated Jun. 4, 2020, 15 pages (with English translation).

Ericsson, "Summary of email discussion on 2 HARQ," R2-1700757, 3GPP TSG-RAN WG2 #97, Athens, Greece, dated Feb. 13-17, 2017, 10 pages, XP051222724.

Renesas Mobile Europe, "DRX and DL SPS," R2-131173, 3GPP TSG-RAN WG2 Meeting #81bis, Chicago, dated Apr. 15-19, 2013, 3 pages, XP050699440.

Extended European Search Report in European Application No. 18770398.8, dated Jan. 14, 2020, 13 pages.

Australian Office Action in Australian Application No. 2018239744, dated Dec. 17, 2020, 5 pages.

Japanese Office Action in Japanese Application No. 2019-599251, dated Sep. 15, 2020, 6 pages (with English translation).

LG Electronics Inc., "Reconsideration on drx-InactivityTimer for NB-IoT," R2-164307, 3GPP TSG-RAN WG2 Meeting #94, Nanjing, China, dated May 23-27, 2016, 6 pages.

CN Office Action in Chinese Appln. No. 201880005183.2, dated May 6, 2021, 12 pages (with English translation).

Ericsson, "Summary of email discussion on 2 HARQ," R2-1700757, 3GPP TSG-RAN WG2 #97, Athens, Greece, dated Feb. 13-17, 2017, 10 pages.

* cited by examiner

[Fig. 1]
E-UMTS
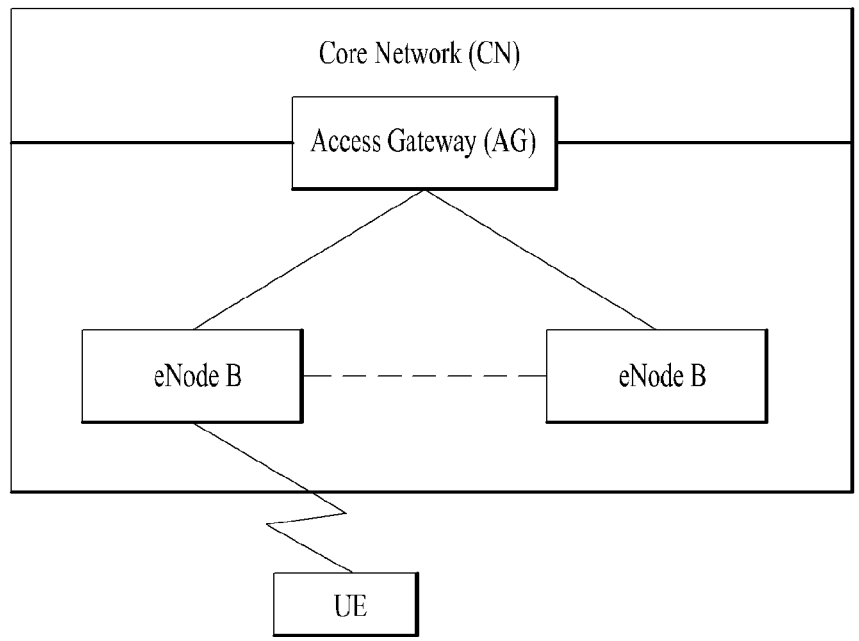
[Fig. 2]
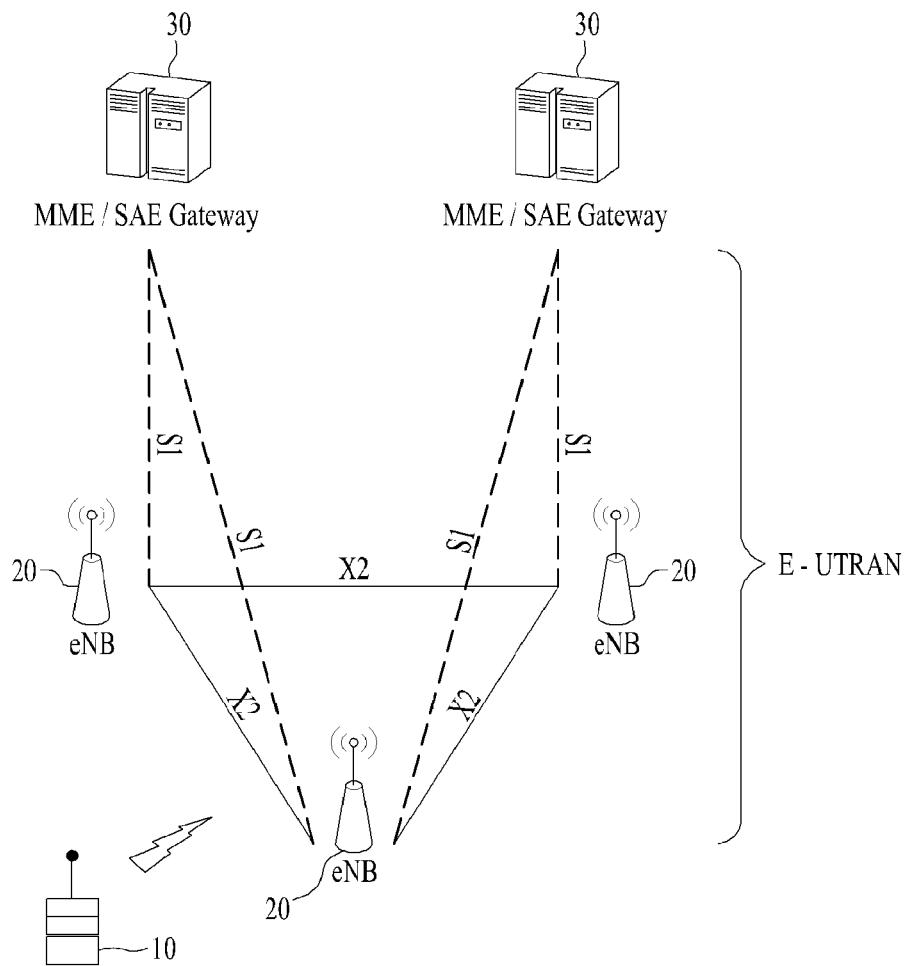

[Fig. 4]
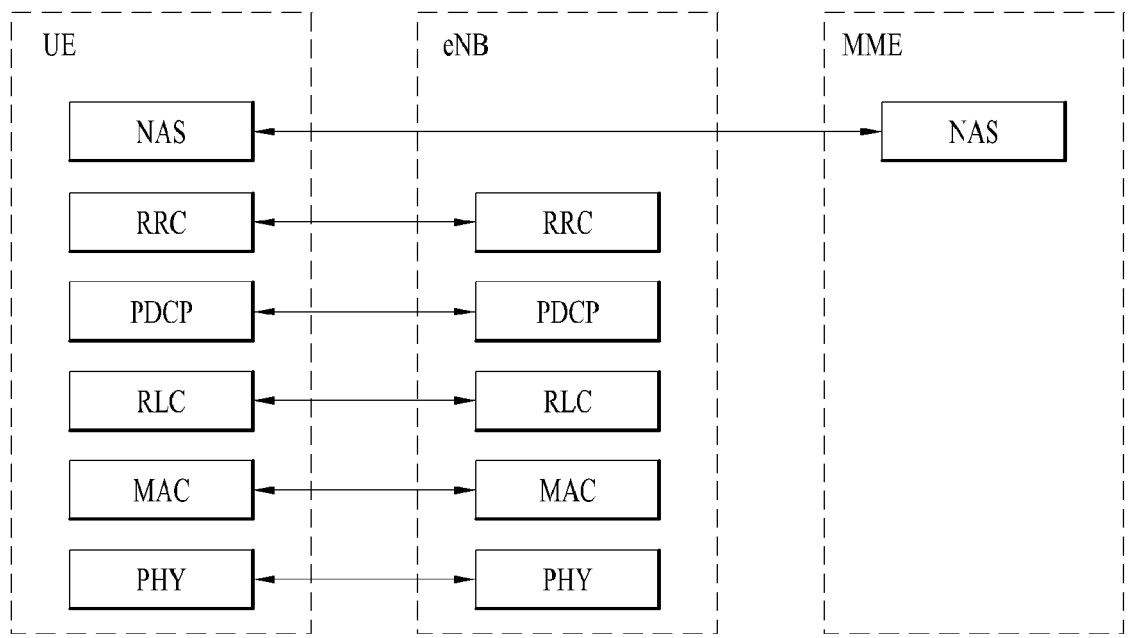
(a) Control-Plane Protocol Stack
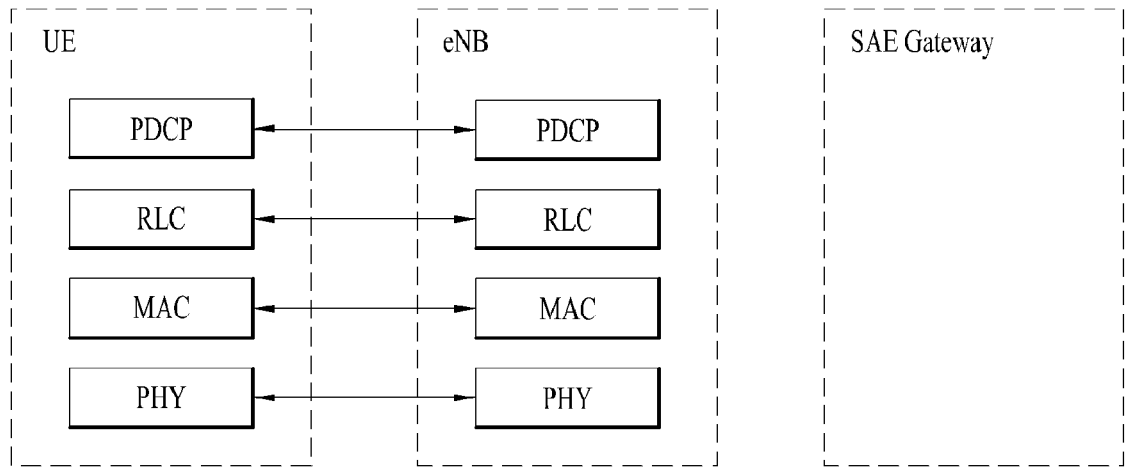
(b) User-Plane Protocol Stack

[Fig. 7]
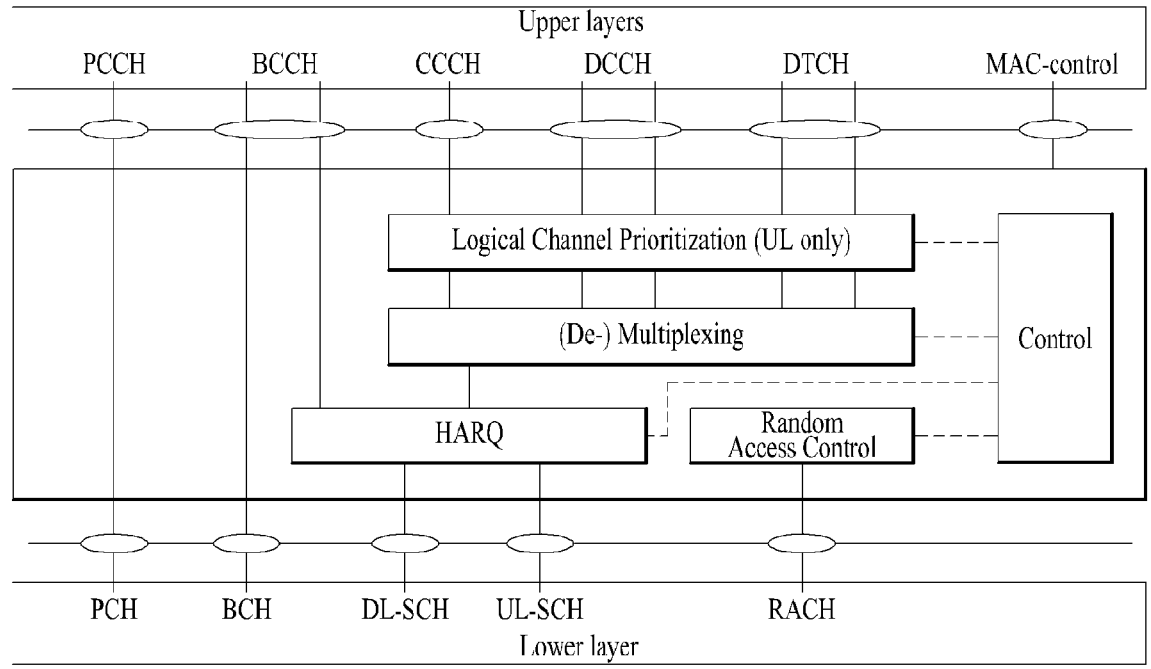
[Fig. 8]
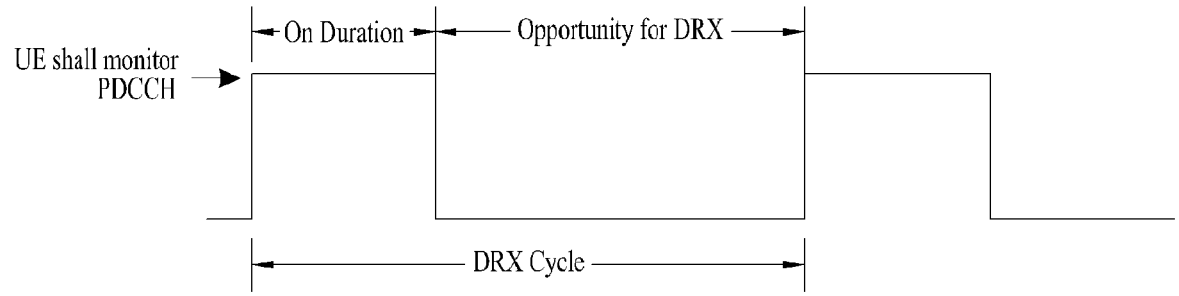
[Fig. 9]
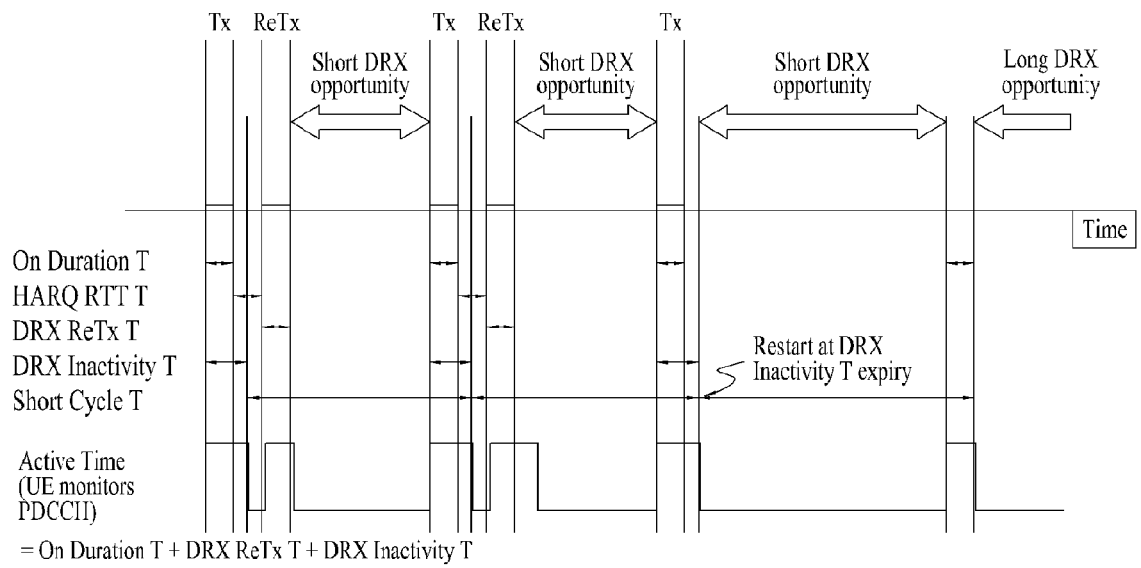

[Fig. 14]
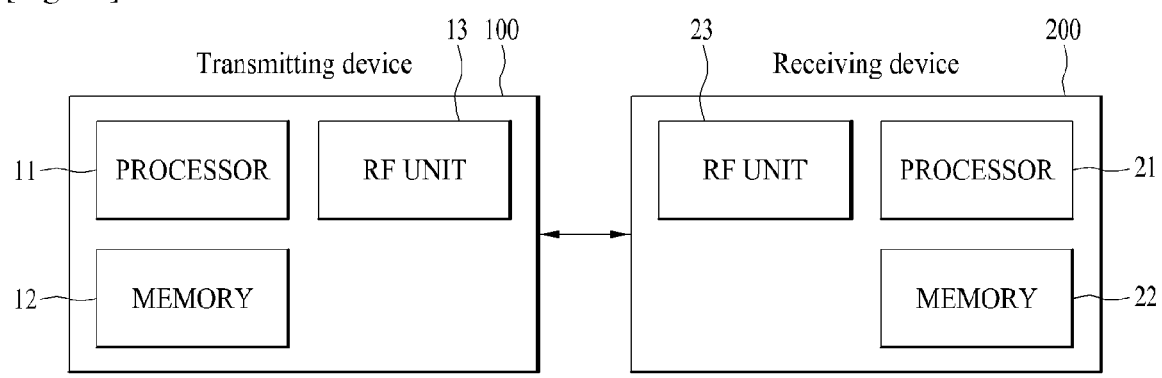

METHOD AND USER EQUIPMENT FOR RECEIVING DOWNLINK SIGNALS

CROSS-REFERENCE TO RELATED APPLICATIONS

This application is a continuation of U.S. application Ser. No. 16/314,271, filed on Dec. 28, 2018, which is a National Stage application under 35 U.S.C. § 371 of International Application No. PCT/KR2018/002928, filed on Mar. 13, 2018, which claims priority under 35 U.S.C. § 119(e) to U.S. Provisional Application No. 62/475,805 filed on Mar. 23, 2017, all of which are hereby expressly incorporated by reference into the present application.

TECHNICAL FIELD

The present invention relates to a wireless communication system, and more particularly, to a method and apparatus for receiving downlink signals.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicastservice, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account advanced mobile broadband communication, massive MTC (mMTC), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

The technical objects that can be achieved through the present invention are not limited to what has been particularly described herein above and other technical objects not described herein will be more clearly understood by persons skilled in the art from the following detailed description.

Technical Solution

In an aspect of the present invention, provided herein is a method of receiving, by a user equipment (UE), downlink signals. The method comprises: starting a downlink (DL) discontinuous reception (DRX) retransmission timer for a DL hybrid automatic repeat and request (HARQ) process of the UE; monitoring a physical downlink control channel (PDCCH) while the DL DRX retransmission timer for the DL HARQ process is running; and stopping the DL DRX retransmission timer for the DL HARQ process when the UE receives a PDCCH indicating a uplink (UL) transmission.

In another aspect of the present invention, provided herein is a user equipment for receiving downlink signals. The UE comprises: a radio frequency (RF) unit, and a processor configured to control the RF unit. The processor is configured to: start a downlink (DL) discontinuous reception (DRX) retransmission timer for a DL hybrid automatic repeat and request (HARQ) process of the UE; monitor a physical downlink control channel (PDCCH) while the DL DRX retransmission timer for the DL HARQ process is running; and stop the DL DRX retransmission timer for the DL HARQ process when the UE receives a PDCCH indicating a uplink (UL) transmission.

In each aspect of the present invention, if there are multiple DL DRX retransmission timers running for multiple DL HARQ processes, all the DL DRX retransmission timers for the multiple DL HARQ processes may be stopped when the UE receives the PDCCH indicating the UL transmission.

In each aspect of the present invention, the DL DRX retransmission timer for the DL HARQ process may be stopped when there is a UL grant configured for a UL HARQ process.

In each aspect of the present invention, the UE may be a UE operating in half duplex.

In each aspect of the present invention, the UE may be a narrowband internet of things (NB-IoT) UE.

In each aspect of the present invention, the DL DRX retransmission for the DL HARQ process may be stopped even when the UE does not receive a PDCCH indicating a DL transmission for the DL HARQ process.

In each aspect of the present invention, the UE may receive DRX configuration information including a value for the DL DRX retransmission timer.

In each aspect of the present invention, the UE may transmit the UL transmission.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

Also, it is possible to efficiently transmit/receive a small amount of data for smart devices, or efficiently transmit/receive data occurring at a low frequency.

According to an embodiment of the present invention, a small amount of data may be efficiently transmitted/received.

It will be appreciated by persons skilled in the art that the effects that can be achieved through the present invention are not limited to what has been particularly described herein-above and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 1 is a view schematically illustrating a network structure of an E-UMTS as an exemplary radio communication system.

FIG. 2 is a block diagram illustrating network structure of an evolved universal mobile telecommunication system (E-UMTS).

FIG. 4 is a diagram showing a control plane and a user plane of a radio interface protocol between a UE and an E-UTRAN based on a 3GPP radio access network standard.

FIG. 7 is a diagram for medium access control (MAC) structure overview in a UE side.

FIG. 8 is a diagram showing a concept of discontinuous reception (DRX).

FIG. 9 is a diagram showing a method for a DRX operation in the current LTE/LTE-A system.

FIG. 14 is a block diagram illustrating elements of a transmitting device 100 and a receiving device 200 for implementing the present invention.

MODE FOR INVENTION

Figure 3:
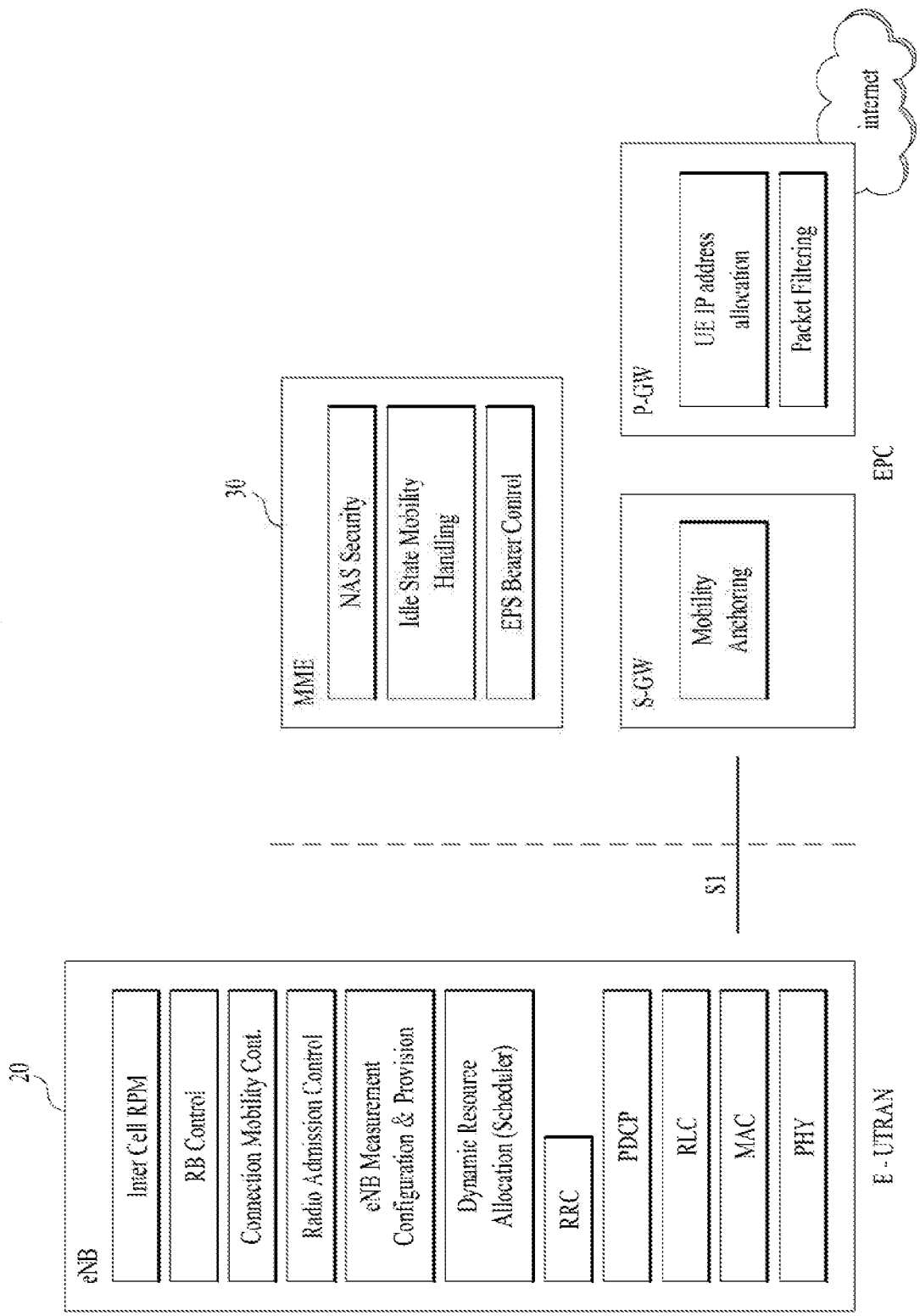
FIG. 3 is a block diagram depicting architecture of a typical E-UTRAN and a typical EPC.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems.

Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321, 3GPP TS 36.322, 3GPP TS 36.300, 3GPP TS 36.323 and 3GPP TS 36.331 may be referenced.

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer (i.e. L1 layer) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer (i.e. L2 layer) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

Radio bearers are roughly classified into (user) data radio bearers (DRBs) and signaling radio bearers (SRBs). SRBs are defined as radio bearers (RBs) that are used only for the transmission of RRC and NAS messages.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
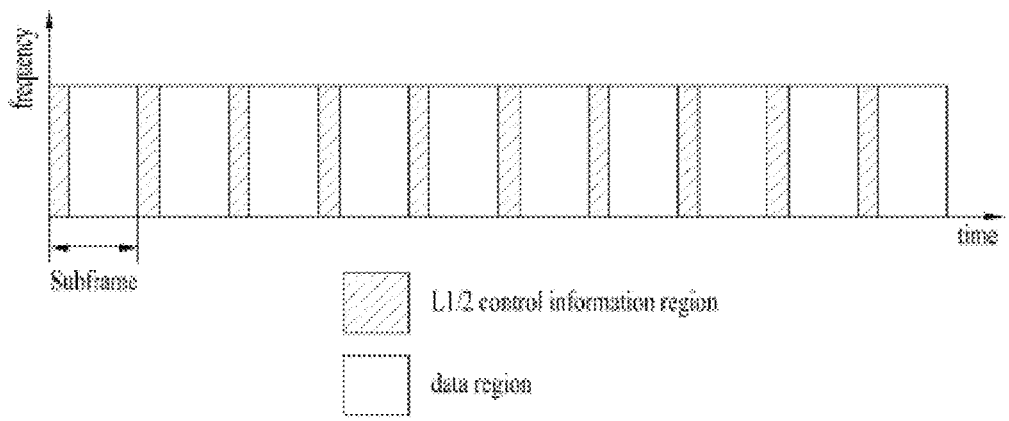
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

Figure 6:
FIG. 6 schematically illustrates three duplex schemes used in bidirectional radio communication.

FIG. 6 schematically illustrates three duplex schemes used in bidirectional radio communication.

A radio frame may have different configurations according to duplex modes. Duplex refers to bidirectional communication between two devices, distinguished from simplex indicating unidirectional communication. In bidirectional communication, transmission on bidirectional links may occur at the same time (full-duplex) or at separate times (half-duplex). In FDD mode, for example, since DL transmission and UL transmission are discriminated according to frequency, a radio frame for a specific frequency band operating on a carrier frequency includes either DL subframes or UL subframes. Referring to FIG. 6(a), a full-duplex transceiver is used to separate two communication links of opposite directions in the frequency domain. That is, different carrier frequencies are adopted in respective link directions. Duplex using different carrier frequencies in respective link directions is referred to as frequency division duplex (FDD). In TDD mode, since DL transmission and UL transmission are discriminated according to time, a radio frame for a specific frequency band operating on a carrier frequency includes both DL subframes and UL subframes. Referring to FIG. 6(c), duplex using the same carrier frequency in respective link directions is referred to as time division duplex (TDD). Referring to FIG. 6(b), the half-duplex transceiver may use different carrier frequencies in respective link directions and this is referred to as half duplex FDD (HD-FDD). In HD-FDD, communication of opposite directions for a specific device occurs not only on different carrier frequencies but also at different timings. Therefore, HD-FDD is regarded as a hybrid of FDD and TDD.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, an opportunity of transmission of a UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 7 is a diagram for medium access control (MAC) structure overview in a UE side.

The MAC layer supports the following functions: mapping between logical channels and transport channels; multiplexing of MAC SDUs from one or different logical channels onto transport blocks (TB) to be delivered to the physical layer on transport channels; demultiplexing of MAC SDUs from one or different logical channels from transport blocks (TB) delivered from the physical layer on transport channels; scheduling information reporting (e.g. scheduling request, buffer status reporting); error correction through HARQ; priority handling between UEs by means of dynamic scheduling; priority handling between logical channels of one MAC entity; Logical Channel Prioritization (LCP); transport format selection; and radio resource selection for sidelink (SL).

There is one HARQ entity at the MAC entity for each serving cell which maintains a number of parallel HARQ processes. Each HARQ process is associated with a HARQ process identifier. The HARQ entity directs HARQ information and associated transport blocks (TBs) received on the DL-SCH to the corresponding HARQ processes. In the legacy LTE/LTE-A system, there are a maximum of 8 DL HARQ processes per serving cell for FDD. In asynchronous HARQ operation, a HARQ process is associated with TTI based on the received UL grant. Each asynchronous HARQ process is associated with a HARQ process identifier. HARQ feedback is not applicable for asynchronous UL HARQ. In the legacy LTE/LTE-A system, there are a maximum of 8 or 16 UL HARQ processes per serving cell for FDD.

FIG. 8 is a diagram showing a concept of discontinuous reception (DRX).

In the LTE/LTE-A system, DRX is performed by a UE to reduce its power consumption due to continuous monitoring of PDCCH, where monitoring implies attempting to decode each of the PDCCHs in a set of PDCCH candidates. Without DRX, the UE has to be awake all the time in order to decode downlink data, as the data in the downlink may arrive at any time. This has serious impact on the power consumption of the UE. The MAC entity may be configured by RRC with a DRX functionality that controls the UE's PDCCH monitoring activity. When in RRC_CONNECTED, if DRX is configured, the MAC entity is allowed to monitor the PDCCH RRC_CONNECTED, using the DRX operation; otherwise the MAC entity monitors the PDCCH continuously. Referring to FIG. 8, if DRX is configured for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle specifies the periodic repetition of the On Duration followed by a possible period of inactivity as shown in FIG. 8.

The UE always monitors a PDCCH during the On Duration in one DRX cycle and a DRX cycle determines a period in which an On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during the On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-Inactivity Timer or a retransmission managing timer, drx-Retransmission Timer as well as an On Duration managing timer, onDurationTimer is running.

RRC controls DRX operation by configuring the timers onDurationTimer, drx-Inactivity Timer, drx-RetransmissionTimer (one per DL HARQ process except for the broadcast process), drx-ULRetransmissionTimer (one per asynchronous UL HARQ process), the longDRX-Cycle, the value of the drxStartOffset and optionally the drxShortCycleTimer and shortDRX-Cycle. An eNB provides a UE with DRX configuration information including these parameters through an RRC signaling. UE receives DRX configuration information. A DL HARQ RTT timer per DL HARQ process (except for the broadcast process) and UL HARQ RTT timer per asynchronous UL HARQ process is also defined. onDurationTimer specifies the number of consecutive PDCCH-subframe(s) at the beginning of a DRX Cycle. drx-Inactivity Timer specifies the number of consecutive PDCCH-subframe(s) after the subframe in which a PDCCH indicates an initial UL, DL or SL user data transmission for this MAC entity. drx-Retransmission Timer specifies the maximum number of consecutive PDCCH-subframe(s) until a DL retransmission is received. drx-ULRetransmissionTimer specifies the maximum number of consecutive PDCCH-subframe(s) until a grant for UL retransmission is received.

drxStartOffset specifies the subframe where the DRX Cycle starts. drxShortCycleTimer specifies the number of consecutive subframe(s) the MAC entity shall follow the Short DRX cycle. A DL HARQ RTT timer specifies the minimum amount of subframe(s) before a DL HARQ retransmission is expected by the MAC entity. UL HARQ RTT timer specifies the minimum amount of subframe(s) before a UL HARQ retransmission grant is expected by the MAC entity.

The value of each of the timers is defined as the number of subframes. The number of subframes is counted until the value of a timer is reached. If the value of the timer is satisfied, the timer expires. A timer is running once it is started, until it is stopped or until it expires; otherwise it is not running. A timer can be started if it is not running or restarted if it is running. A timer is always started or restarted from its initial value.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. A bandwidth reduced low complexity (BL) UE or a UE in enhanced coverage may be corresponding to an MTC UE.

Lots of devices are expected to be wirelessly connected to the internet of things (IoT). The IoT is the inter-networking of physical devices, vehicles (also referred to as "connected devices" and "smart devices"), buildings, and other items embedded with electronics, software, sensors, actuators, and network connectivity that enable these objects to collect and exchange data. In other words, the IoT refers to a network of physical objects, machines, people, and other devices that enable connectivity and communication to exchange data for intelligent applications and services. The IoT allows objects to be sensed and controlled remotely through existing network infrastructures, providing opportunities for the direct integration between the physical and digital worlds, resulting in improved efficiency, accuracy and economic benefits. Particularly, in the present invention, the IoT using 3GPP technology is referred to as cellular IoT (CIoT). The CIoT that transmits/receives the IoT signal using a narrowband (e.g., a frequency band of about 200 kHz) is called an NB-IoT. The CIoT can be used to monitor traffic transmitted over relatively long periods, e.g., from a few decades to a year (e.g., smoke alarm detection, power failure notification from smart meters, tamper notification, smart utility (gas/water/electricity) metering reports, software patches/updates, etc.) and ultra-low complexity, power limited and low data rate 'IoT' devices. The CIoT is a technology for solving the problem that a conventional attach procedure or service request procedure causes a power waste of a UE due to a large number of message exchanges. The CIoT minimizes the power consumption of the UE through the C-plane solution in which the MME processes the data or through the U-plane solution in which the UE and the eNB maintain the context even if the UE is in a state similar to the RRC idle state and utilize the context for the next connection. As the name implies, the narrowBand internet of things (NB-IoT) is a wireless technology that provides IoT service using a narrowband frequency of about 200 kHz. The NB-IoT uses a very small frequency compared to the conventional LTE technology using a frequency band of at least 1.25 MHz. Therefore, the NB-IoT minimizes processing power and minimizing power consumption on the UE side. The CIoT network or technology mainly provides the optimized communication service for the IoT UE in terms of the core network, and the NB-IoT network or technology optimizes the radio interface of the existing LTE technology for IoT. Therefore, the NB-IoT radio technology and CIoT technology can be applied separately. That is, even if the NB-IoT radio technology is not used, it is possible to apply the CIoT technology through the conventional LTE radio network. This means that the CIoT technology can be applied to UEs that cannot use the NB-IoT radio technology, for example, UEs already released with LTE radio technology only. In addition, it means that conventional LTE radio technology based cells can support conventional LTE UEs such as smart phones while simultaneously supporting IoT UEs.

The downlink transmission scheme for NB-IoT is similar to that of the general LTE/LTE-A/NR UE, with the differences that in the frequency domain, there is one resource block for an NB-IoT carrier, the OFDM sub-carrier spacing $\Delta f=15$ kHz always, and only operation with half duplex from NB-IoT UE point of view is supported. A NB-IoT UE can be configured with more than one NB-IoT carrier.

PDCCH carrying DCI for NB-IoT is referred to as "NPDCCH", PDSCH carrying downlink data for NB-IoT is referred to as "NPDSCH", and PUSCH carrying uplink data for NB-IoT is referred to as "NPUSCH".

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for the new RAT (NR) System (also referred to as 5G new RAT). It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

In the legacy LTE/LTE-A, transmission time interval (TTI) is used in MAC layer as a basic time unit that MAC delivers a MAC PDU to PHY, which is fixed to 1 ms. In other words, HARQ entity delivers a MAC PDU to PHY once per TTI. Multiple numerologies, i.e., multiple subcarrier spacings, such as 30 kHz, 60 kHz, etc, are being studied for the new radio access technology. multiple time units such as slot and mini-slot are under discussion in multiple subcarrier spacing, where mini-slot is the smallest possible scheduling unit and smaller than a slot or subframe. Although the concept of slot has already been in the legacy LTE/LTE-A, it is fixed to 0.5 ms corresponding to 7 OFDM symbols and transparent to the MAC layer operation. In NR, however, slot or mini-slot may have different durations in time depending on the subcarrier spacing. For example, a slot duration would be 0.5 ms for 30 kHz subcarrier spacing while a slot duration would be 0.25 ms for 50 kHz subcarrier spacing. Furthermore, it is required for MAC layer to operate based on slot and/or mini-slot, i.e., the HARQ entity delivers a MAC PDU to PHY once per slot or mini-slot. Considering that it is up to network decision whether to schedule in unit of subframe, slot, or mini-slot, or which subcarrier spacing is to be used, the time unit used for the MAC layer operation may change dynamically. Although the present invention is described with reference to 1 ms TTI and a TTI length shorter than 1 ms, the present invention can be also applied to a TTI duration longer than 1 ms in the same way as or similar way to the following description. A short TTI with 7 OFDM symbols and 2 OFDM symbols are introduced as a slot and a mini-slot, respectively, and a short TTI with 1 OFDM symbol is under discussion for a mini-slot. Accordingly, in the NR system, MAC needs to operate based on multiple TTIs. The time unit mentioned as a subframe in the above or following description of the present invention can be a slot, mini-slot, symbol(s), millisecond(s), or second(s).

FIG. 9 is a diagram showing a method for a DRX operation in the current LTE/LTE-A system.

When a DRX cycle is configured, the Active Time includes the time while:
  onDurationTimer or drx-Inactivity Timer or drx-RetransmissionTimer or drx-ULRetransmission Timer or mac-ContentionResolutionTimer is running; or
  a Scheduling Request is sent on PUCCH and is pending; or
  an uplink grant for a pending HARQ retransmission can occur and there is data in the corresponding HARQ buffer for synchronous HARQ process; or
  a PDCCH indicating a new transmission addressed to the C-RNTI of the MAC entity has not been received after successful reception of a Random Access Response for the preamble not selected by the MAC entity.

When DRX is configured, for each subframe, the MAC entity shall:
  if a DL HARQ RTT timer expires in this subframe:
    if the data of the corresponding HARQ process was not successfully decoded:
      start the drx-RetransmissionTimer for the corresponding HARQ process.
    if NB-IoT, start or restart the drx-Inactivity Timer.
  if a UL HARQ RTT timer expires in this subframe:
    start the drx-ULRetransmissionTimer for the corresponding HARQ process.
    if NB-IoT, start or restart the drx-Inactivity Time.
  if a DRX Command MAC control element or a Long DRX Command MAC control element is received:
    stop onDurationTimer;
    stop drx-Inactivity Timer.
  if drx-InactivityTimer expires or a DRX Command MAC control element is received in this subframe:
    if the Short DRX cycle is configured:
      start or restart drxShortCycleTimer;
      use the Short DRX Cycle.
    else:
      use the Long DRX cycle.
  if drxShortCycleTimer expires in this subframe:
    use the Long DRX cycle.
  if a Long DRX Command MAC control element is received:
    stop drxShortCycleTimer;
    use the Long DRX cycle.
  If the Short DRX Cycle is used and {(SFN*10)+subframe number} modulo (shortDRX-Cycle)=(drxStartOffset) modulo (shortDRX-Cycle); or
  if the Long DRX Cycle is used and {(SFN*10)+subframe number} modulo (longDRX-Cycle)=drxStartOffset:
    if NB-IoT:
      if there is at least one HARQ process for which neither HARQ RTT Timer nor UL HARQ RTT Timer is running, start onDurationTimer.
    else:
      start onDurationTimer.
  during the Active Time, for a PDCCH-subframe, if the subframe is not required for uplink transmission for half-duplex FDD UE operation, and if the subframe is not a half-duplex guard subframe (see 3GPP TS 36.211) and if the subframe is not part of a configured measurement gap and if the subframe is not part of a configured Sidelink Discovery Gap for Reception, and for NB-IoT if the subframe is not required for uplink transmission or downlink reception other than on PDCCH; or
  during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId (see 3GPP TS 36.331) and if the subframe is not part of a configured measurement gap and if the subframe is not part of a configured Sidelink Discovery Gap for Reception; or
  during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap and if the subframe is not part of a configured Sidelink Discovery Gap for Reception:
    monitor the PDCCH;
    if the PDCCH indicates a DL transmission or if a DL assignment has been configured for this subframe:
      if the UE is an NB-IoT UE, a BL UE or a UE in enhanced coverage:
        start the HARQ RTT Timer for the corresponding HARQ process in the subframe containing the last repetition of the corresponding PDSCH reception;
      else:
        start the HARQ RTT Timer for the corresponding HARQ process;

stop the drx-Retransmission Timer for the corresponding HARQ process.
  if NB-IoT, stop drx-ULRetransmissionTimer for all UL HARQ processes.
if the PDCCH indicates a UL transmission for an asynchronous HARQ process or if a UL grant has been configured for an asynchronous HARQ process for this subframe:
  start the UL HARQ RTT Timer for the corresponding HARQ process in the subframe containing the last repetition of the corresponding PUSCH transmission;
  stop the drx-ULRetransmissionTimer for the corresponding HARQ process.
if the PDCCH indicates a new transmission (DL, UL or SL):
  except for a NB-IoT UE configured with a single DL and UL HARQ process, start or restart drx-Inactivity Timer.
if the PDCCH indicates a transmission (DL, UL) for a NB-IoT UE:
  if the NB-IoT UE is configured with a single DL and UL HARQ process:
    stop drx-InactivityTimer
    stop onDurationTimer.

Stopping or starting condition for drx-ULRetransmission-Timer is different from that for drx-RetransmssionTimer. For a UL transmission, a UE does not know until the UE receives a feedback from an eNB, and the feedback for the UL transmission can be lost even if the eNB transmits the feedback. If the UE performs the UL transmission, there is possibility that the eNB feeds ACK/NACK for the UL transmission to the UE. Accordingly, a UE having performed the UL transmission starts or restarts drx-ULRetransmissionTimer when UL HARQ RTT Timer expires. For a DL transmission, a UE knows whether the DL transmission is successful since the UE tried to decode the DL transmission, and transmits ACK or NACK based on the decoding result of the DL transmission. In the LTE/LTE-A system, if a UE transmits NACK for a DL transmission, the UE starts or restarts drx-Retransmission Timer when HARQ RTT Timer for the corresponding HARQ process expires. If the UE transmits ACK for a DL transmission, the UE does not starts drx-Retransmission Timer. In other words, for a DL transmission, a UE starts drx-RetransmissionTimer only if the UE transmits NACK for the DL transmission. Therefore, one could think that a UE having transmitted NACK would receive a retransmission grant from an eNB in response to the NACK. However, the eNB may have the scheduling policy where a new UL transmission has higher priority than a DL retransmission. Under the scheduling policy, the eNB may transmit a new transmission grant prior to or instead of a DL retransmission grant and, if necessary, transmits the DL retransmission grant after transmitting the new transmission grant. In other words, a UE may receive a UL transmission grant while drx-RetransmissionTimer for DL retransmission is running.

In the above description, PDCCH-subframe refers to a subframe with PDCCH. For a MAC entity not configured with any TDD serving cell(s), this represents any subframe; for a MAC entity configured with at least one TDD serving cell, if a MAC entity is capable of simultaneous reception and transmission in the aggregated cells, this represents the union over all serving cells of downlink subframes and subframes including DwPTS of the TDD UL/DL configuration indicated by tdd-Config (see 3GPP TS 36.331) parameter provided through an RRC signaling, except serving cells that are configured with schedulingCellId parameter provided through an RRC signaling; otherwise, this represents the subframes where the SpCell is configured with a downlink subframe or a subframe including DwPTS of the TDD UL/DL configuration indicated by tdd-Config.

For NB-IoT, DL and UL transmissions will not be scheduled in parallel, i.e. if a DL transmission has been scheduled a UL transmission shall not be scheduled until HARQ RTT Timer of the DL HARQ process has expired (and vice versa).

Figure 10:
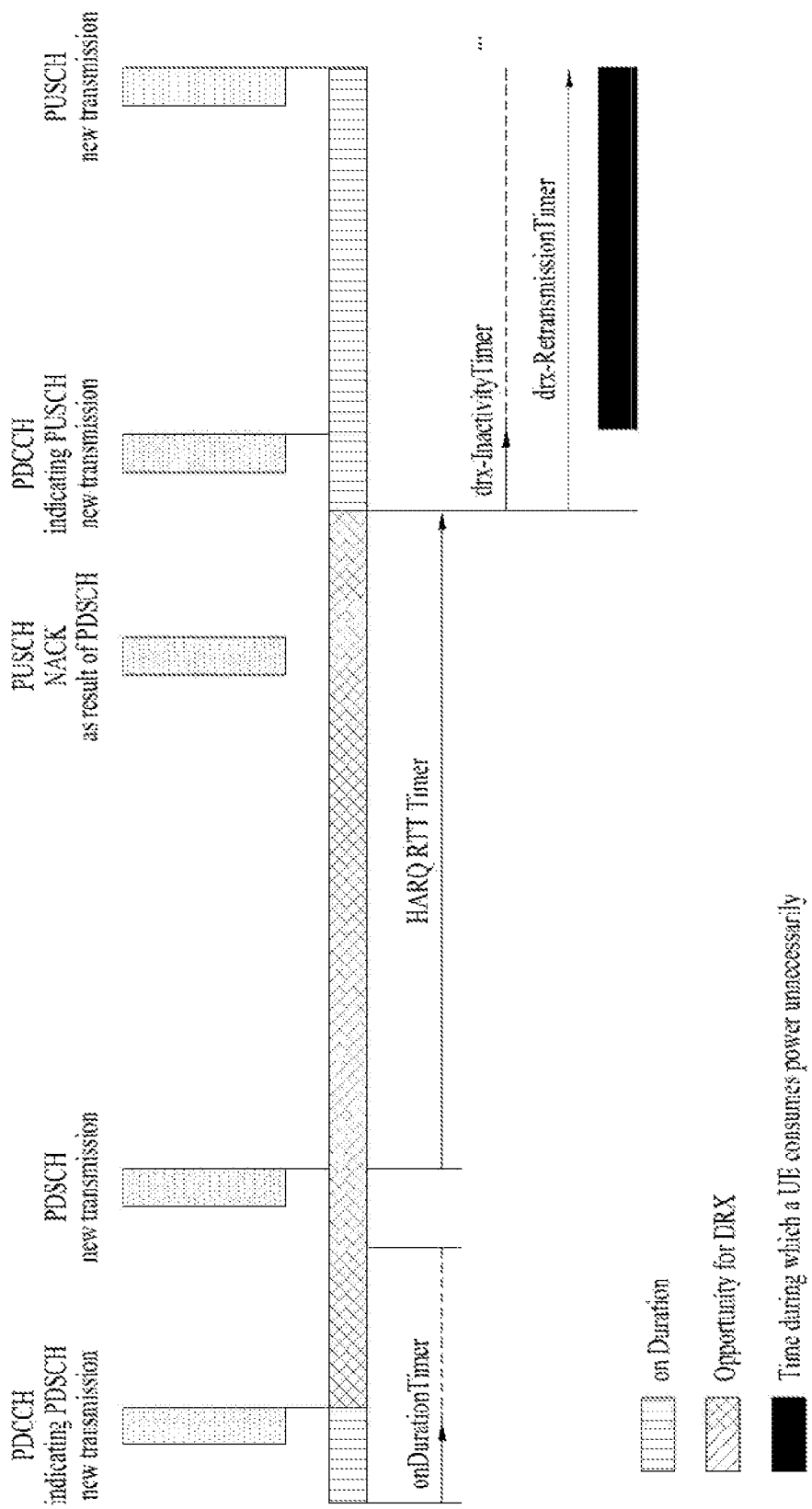
FIG. 10 illustrates operations of DRX timers in a UE supporting one HARQ process.

FIG. 10 illustrates operations of DRX timers in a UE supporting one HARQ process.

In 3GPP LTE Release 13 (hereinafter, 3GPP LTE Rel-13), an NB-IoT UE can support only one HARQ process. In 3GPP LTE Rel-13, the drx-ULRetransmissionTimer is stopped whenever a DL or UL transmission is indicated on PDCCH. In other words, if the UE receives PDCCH indicated by a transmission (DL, UL), the UE stops drx-InactivityTimer, drx-ULRetransmissionTimer and onDurationTimer. However, in 3GPP LTE Release 13, drx-Retransmission Timer is only stopped when a DL transmission is indicated on PDCCH. If the UE receives a UL grant (e.g., PDCCH indicating PUSCH new transmission in FIG. 10) after sending NACK of DL data, then drx-Inactivity Timer is stopped but the drx-Retransmission-Timer is still running. For NB-IoT, this could have power of the UE consumed unnecessarily (during the time period marked with solid black marking in FIG. 10), because the UE as NB-IoT supports half duplex operation only.

Recently, it is under discussion to allow a NB-IoT UE supporting 2 HARQ processes. In this case, the stop condition of the drx-ULRetransmissionTimer could be modified as follows. If the UE receives PDCCH indicated by a UL transmission, the drx-ULRetransmissionTimer is stopped for the corresponding HARQ process. If the UE receives PDCCH indicated by a DL transmission, the drx-ULRetransmissionTimer is stopped for all UL HARQ processes. However, like in the 3GPP LTE Rel-13 UE, the drx-RetransmissionTimer is only stopped when a DL transmission is indicated on PDCCH.

Figure 11:
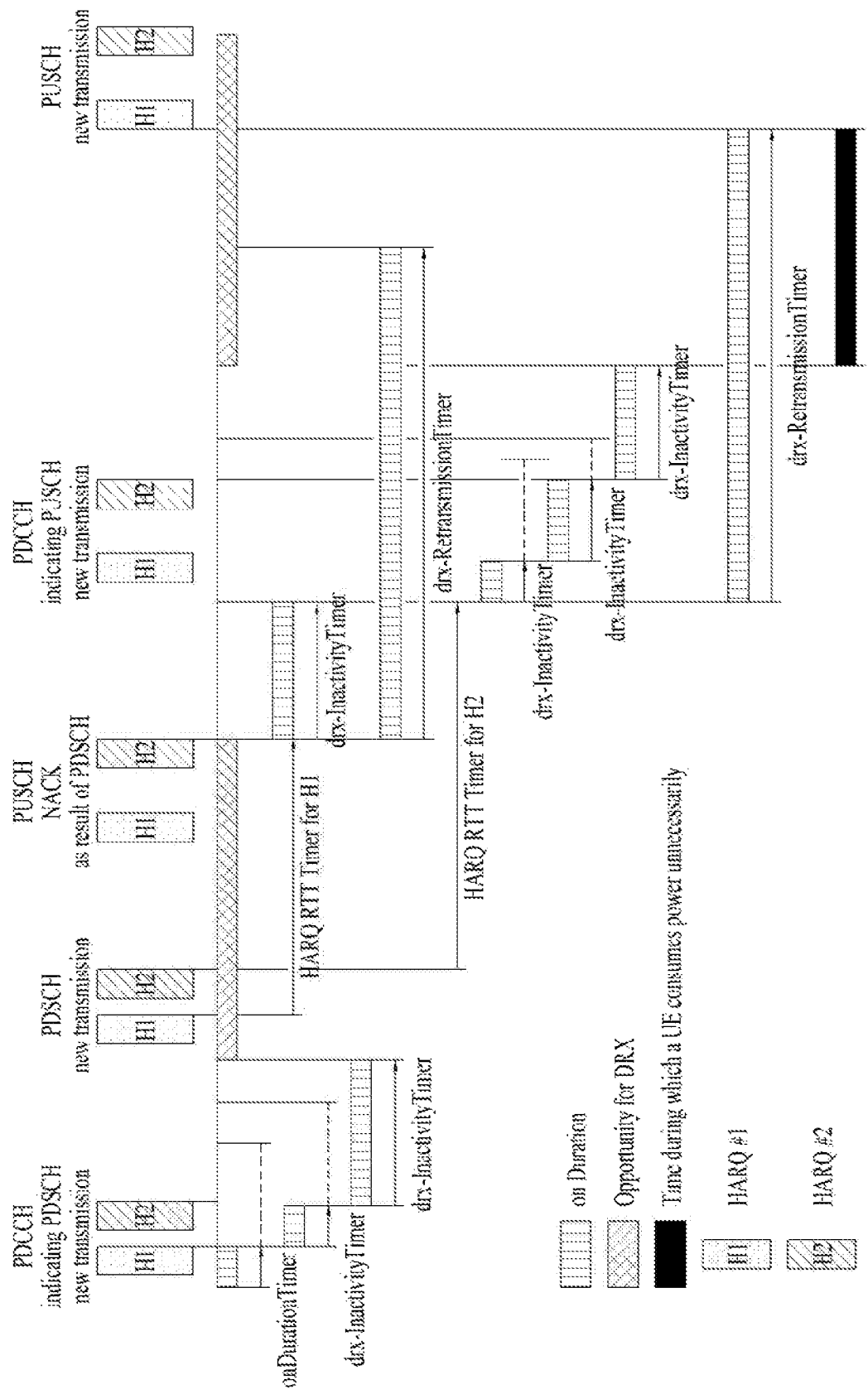
FIG. 11 illustrates operations of DRX timers in a UE supporting two HARQ processes.

FIG. 11 illustrates operations of DRX timers in a UE supporting two HARQ processes.

In FIG. 11, it is assumed that the DL transmission for two HARQ processes (HARQ #1 and HARQ #2) fails and that the UE receives a UL grant for HARQ #1 and receives a UL grant for HARQ #2 after corresponding HARQ RTT Timer expires. It is also assumed that the UE receives a UL grant for the first HARQ process (HARQ #1) after HARQ RTT Timer for second HARQ process (HARQ #2) expires. In this case, drx-RetransmissionTimers are still running as the value configured by higher layer (e.g. RRC layer). For NB-IoT, this could have power of the UE consumed unnecessarily (during the time period marked with solid black marking in FIG. 11), because the UE as NB-IoT supports half duplex operation only.

To avoid consuming power of a UE unnecessarily, the present invention proposes that, if a UE receives a PDCCH indicating a PUSCH transmission using a UL HARQ process or if a UL grant has been configured for a UL HARQ process, the UE stop drx-RetransmissionTimer for all DL HARQ processes, if running. If a PDCCH indicating a PUSCH transmission is received in a time point (e.g. subframe, slot, mini-slot, symbol, millisecond, or second) or if a UL grant has been configured for this time point, the UE stops drx-RetransmissionTimer for all DL HARQ processes at that time point. The PUSCH transmission may be new transmission or retransmission. The HARQ process may be asynchronous HARQ process.

In the present invention, for example, a UE may operate as follows. The UE is configured with DRX configuration including drx-RetransmissionTimer. The UE monitors PDCCH while the drx-RetransmissionTimer is running. The UE receives a PDCCH indicating a PDSCH new transmission on a DL HARQ process. The UE receives the PDSCH new transmission using the DL HARQ process indicated by the PDCCH. After receiving the PDSCH new transmission, the UE starts HARQ RTT Timer for the DL HARQ process that is used for receiving a next PDSCH new transmission. The UE starts the drx-Retransmission Timer when the HARQ RTT Timer expires. The UE monitors PDCCH(s) while the drx-RetransimssionTimer is running. The UE stops the drx-Retransmission Timer when the UE receives a PDCCH indicating a PUSCH transmission. The UE does not monitor PDCCH(s) until the UE becomes Active Time due to other DRX related timers. The drx-RetransmissionTimer specifies the maximum number of consecutive PDCCH-subframe(s) until a DL retransmission is received. The HARQ RTT Timer specifies the minimum amount of subframe(s) before a DL assignment for HARQ retransmission is expected by the MAC entity.

In examples of the present invention, PDCCH refers to PDCCH, EPDCCH, R-PDCCH, MPDCCH, or NPDCCH, PDSCH refers to PDSCH or NPDSCH, and PUSCH refers to PUSCH or NPUSCH.

Although the present invention is described for UEs supporting only one or two HARQ processes, the present invention can be also applied to UEs supporting more than two HARQ processes if the UEs support half duplex mode only.

Figure 12:
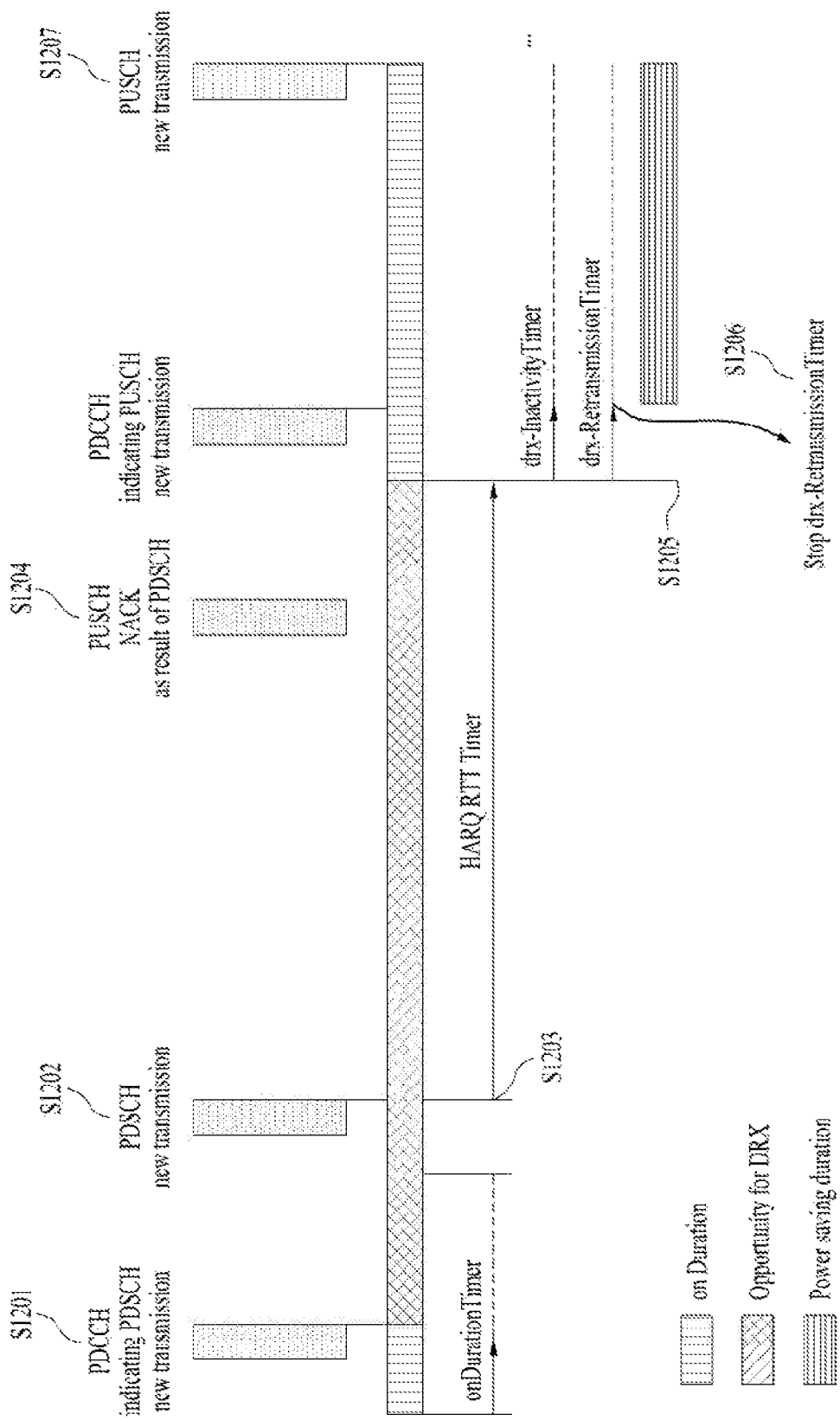
FIG. 12 illustrates operations of DRX timers in a UE supporting one HARQ process according to the present invention.

FIG. 12 illustrates operations of DRX timers in a UE supporting one HARQ process according to the present invention. The UE supporting one HARQ process may be an NB-IoT UE.

Referring to FIG. 12, drx-RetransmissionTimer in a UE supporting only one HARQ process may be stopped through a procedure as follows.

S1201. A UE configured with DRX receives a PDCCH indicating a PDSCH new transmission.

S1202. After receiving the PDCCH indicating the PDSCH new transmission, the UE receives the PDSCH new transmission using a DL HARQ process and a scheduling delay indicated by the PDCCH.

S1203. After receiving the PDSCH new transmission, the UE starts a HARQ RTT Timer for the DL HARQ process in the subframe containing the last repetition of the PDSCH new transmission.

S1204. If the PDSCH new transmission was not successfully decoded, then the UE sends NACK on a PUSCH according to HARQ-ACK resource indicated in the PDCCH.

S1205. If the HARQ RTT Timer expires, the UE starts drx-RetransmissionTimer for the DL HARQ process, and starts drx-InactivityTimer.

S1206. If the UE receives a PDCCH indicating a PUSCH new transmission, the UE stops drx-Retransmission Timer for the DL HARQ process, and stops the drx-Inactivity Timer.

S1207. The UE sends a PUSCH new transmission according to the PDCCH indicating the PUSCH new transmission.

An NB-IoT UE does not monitor PDCCH(s) during subframe(s) between the PDCCH and the PUSCH because the NB-IoT UE can only support half-duplex mode. Unlike the conventional operations of drx-RetransmissionTimer, the present invention can further save power for half duplex UEs in the time duration marked with horizontally hatched marking in FIG. 12.

Figure 13:
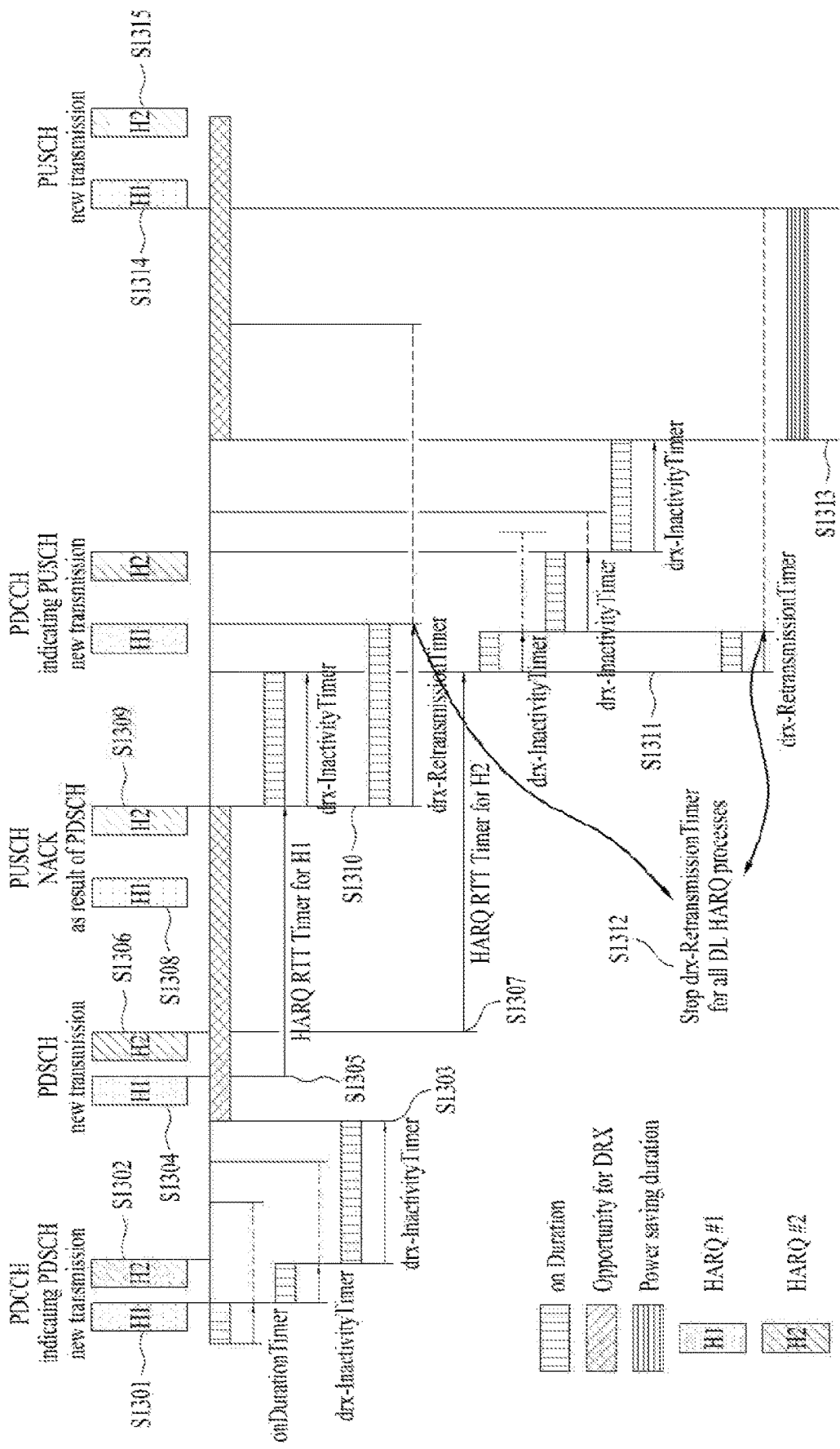
FIG. 13 illustrates operations of DRX timers in a UE supporting two HARQ processes according to the present invention.

FIG. 13 illustrates operations of DRX timers in a UE supporting two HARQ processes according to the present invention. The UE supporting two HARQ processes may be an NB-IoT UE.

S1301. An UE configured with DRX receives a PDCCH indicating a PDSCH new transmission for a DL HARQ process #1 (HARQ #1). The UE starts a drx-Inactivity Timer.

S1302. The UE receives a PDCCH indicating a PDSCH new transmission for a DL HARQ process #2 (HARQ #2) when the drx-InactivityTimer is running. The UE restarts the drx-Inactivity Timer.

S1303. The UE enters DRX when the drx-InactivityTimer expires.

S1304. After receiving the PDCCH indicating the PDSCH new transmission for the DL HARQ #1, the UE receives the PDSCH new transmission using the DL HARQ #1 according to a scheduling delay of the PDCCH for the DL HARQ #1.

S1305. After receiving the PDSCH new transmission for the DL HARQ #1, the UE starts a HARQ RTT Timer for the DL HARQ #1 in the subframe containing the last repetition of the PDSCH new transmission for the DL HARQ #1.

S1306. After receiving the PDCCH indicating the PDSCH new transmission for the DL HARQ #2, the UE receives the PDSCH new transmission using the DL HARQ #2 according to a scheduling delay of the PDCCH for the DL HARQ #2.

S1307. After receiving the PDSCH new transmission for the DL HARQ #2, the UE starts a HARQ RTT Timer for the DL HARQ #2 in the subframe containing the last repetition of the PDSCH new transmission for the DL HARQ#2.

S1308. If the PDSCH new transmission for DL HARQ #1 was not successfully decoded, then the UE sends NACK on a PUSCH for the DL HARQ #1 according to HARQ-ACK resource in the PDCCH for DL HARQ #1.

S1309. If the PDSCH new transmission for DL HARQ #2 was not successfully decoded, then the UE sends NACK on a PUSCH for the DL HARQ #2 according to HARQ-ACK resource in the PDCCH for DL HARQ #2.

S1310. If the HARQ RTT Timer for DL HARQ #1 expires, the UE starts a drx-Retransmission Timer for the DL HARQ #1, and starts a drx-InactivityTimer.

S1311. If the HARQ RTT Timer for DL HARQ #2 expires, the UE starts a drx-Retransmission Timer for the DL HARQ #2, and restarts a drx-Inactivity Timer.

S1312. If the UE receives a PDCCH indicating a PUSCH new transmission for any of the UL HARQ process, the UE stops the drx-Retransmission Timers for all DL HARQ processes, and restarts the drx-Inactivity Timer.

S1313. The UE enters DRX when the drx-InactivityTimer expires.

S1314. The UE sends the PUSCH new transmission for the UL HARQ #1 according to the PDCCH indicating the PUSCH new transmission for the UL HARQ #1.

S1315. The UE sends the PUSCH new transmission for the UL HARQ #2 according to the PDCCH indicating the PUSCH new transmission for the UL HARQ #2.

Unlike the conventional operations of drx-RetransmissionTimer, the present invention can further save power for half duplex UEs in the time duration marked with horizontally hatched marking in FIG. 13.

FIG. 14 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor starts a downlink (DL) discontinuous reception (DRX) retransmission timer for a DL hybrid automatic repeat and request (HARQ) process of the UE. The UE processor monitors a physical downlink control channel (PDCCH) while the DL DRX retransmission timer for the DL HARQ process is running. The UE processor stops the DL DRX retransmission timer for the DL HARQ process when the UE RF unit receives a PDCCH indicating a uplink (UL) transmission. If there is multiple DL DRX retransmission timers running for multiple DL HARQ processes, the UE processor stops all the DL DRX retransmission timers for the multiple DL HARQ processes when the UE RF unit receives the PDCCH indicating the UL transmission. The UE processor stops the DL DRX retransmission timer for the DL HARQ process when there is a UL grant configured for a UL HARQ process. The UE may be a UE operating in half duplex. The UE may be a narrowband internet of things (NB-IoT) UE. The UE processor stops the DL DRX retransmission for the DL HARQ process even when the UE does not receive a PDCCH indicating a DL transmission for the DL HARQ process. The UE processor controls the UE RF unit to receive DRX configuration information including a value for the DL DRX retransmission timer. The UE processor controls the UE RF unit to transmit the UL transmission.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for receiving, by a user equipment (UE), downlink signals in a wireless communication system, the method comprising:
   starting, by the UE, a downlink (DL) discontinuous reception (DRX) retransmission timer for a DL hybrid automatic repeat and request (HARQ) process of the UE;
   receiving, by the UE, a physical downlink control channel (PDCCH) indicating an uplink (UL) transmission; and
   stopping, by the UE, the DL DRX retransmission timer for the DL HARQ process based on receiving the PDCCH indicating the UL transmission,
   wherein the UE supports multiple DL HARQ processes including the DL HARQ process, and
   wherein stopping, by the UE, the DL DRX retransmission timer for the DL HARQ process based on receiving the PDCCH indicating the UL transmission comprises:
      stopping all of respective DL DRX retransmission timers for the multiple DL HARQ processes based on receiving the PDCCH indicating the UL transmission.

2. The method according to claim 1, wherein the UE stops the DL DRX retransmission timer for the DL HARQ process based on an UL grant configured for a UL HARQ process.

3. The method according to claim 1, wherein the UE is a UE operating in half duplex.

4. The method according to claim 1, wherein the UE is a narrowband internet of things (NB-IoT) UE.

5. The method according to claim 1, wherein the UE stops the DL DRX retransmission timer for the DL HARQ process based on receiving the PDCCH indicating the UL transmission, in a state where the UE does not receive a PDCCH indicating a DL transmission for the DL HARQ process.

6. The method according to claim 1, further comprising:
   receiving, by the UE, DRX configuration information including a value for the DL DRX retransmission timer.

7. The method according to claim 1, further comprising:
   performing, by the UE, the UL transmission.

8. A device for a user equipment (UE) in a wireless communication system, the device comprising:
   at least one processor; and
   at least one computer memory that is operably connectable to the at least one processor and that has stored thereon instructions which, when executed, cause the at least one processor to perform operations comprising:
      starting a downlink (DL) discontinuous reception (DRX) retransmission timer for a DL hybrid automatic repeat and request (HARQ) process;
      receiving a physical downlink control channel (PDCCH) indicating an uplink (UL) transmission; and
      stopping the DL DRX retransmission timer for the DL HARQ process based on receiving the PDCCH indicating the UL transmission,
      wherein the UE supports multiple DL HARQ processes including the DL HARQ process, and
      wherein stopping, by the UE, the DL DRX retransmission timer for the DL HARQ process based on receiving the PDCCH indicating the UL transmission comprises:
         stopping all of respective DL DRX retransmission timers for the multiple DL HARQ processes based on receiving the PDCCH indicating the UL transmission.

9. The device according to claim 8, wherein the operations further comprise:
   stopping the DL DRX retransmission timer for the DL HARQ process based on an UL grant configured for a UL HARQ process.

10. The device according to claim 8, wherein the UE is a UE operating in half duplex.

11. The device according to claim 8, wherein the UE is a narrowband internet of things (NB-IoT) UE.

12. The device according to claim 8, wherein the operations stop the DL DRX retransmission timer for the DL HARQ process based on receiving the PDCCH indicating the UL transmission, in a state where a PDCCH indicating a DL transmission for the DL HARQ process is not received.

13. The device according to claim 8, wherein the operations further comprise:
   receiving DRX configuration information including a value for the DL DRX retransmission timer.

14. The device according to claim 8, wherein the operations further comprise:
   transmitting, via a transceiver of the UE, the UL transmission.

* * * * *